Sept. 25, 1951     J. P. YOUNG     2,569,363
EMERGENCY SHUTOFF FOR FAUCETS
Filed March 21, 1949
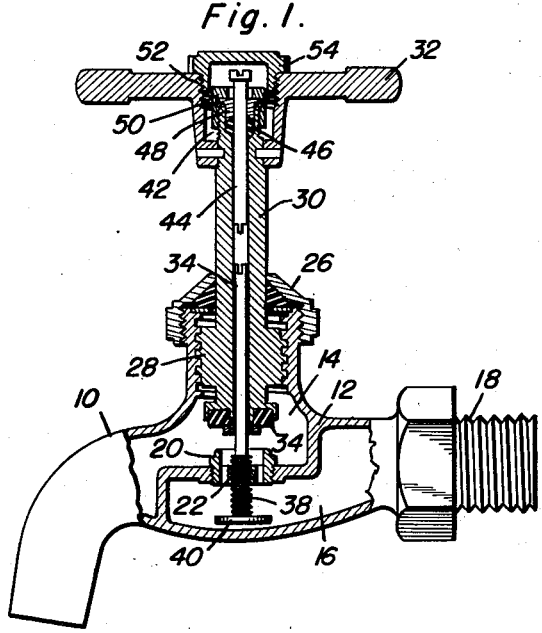
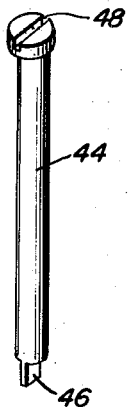
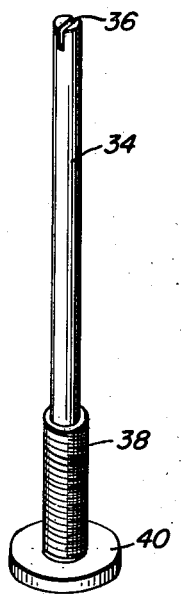
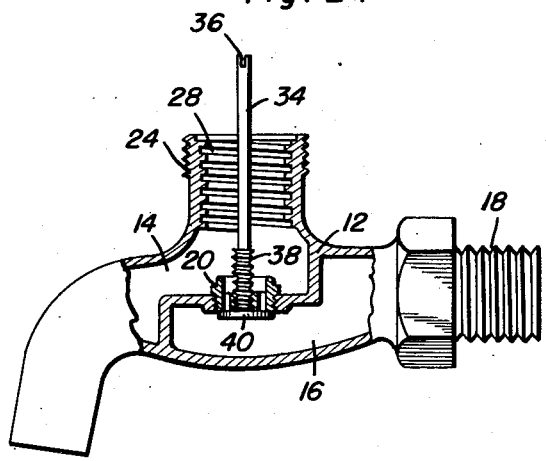
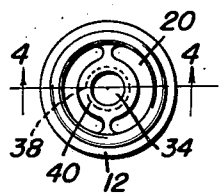
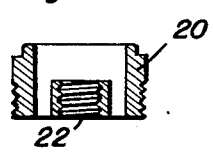
Inventor
James P. Young
By *Clarence A. O'Brien and Harvey B. Jacobson*
Attorneys Patented Sept. 25, 1951

2,569,363

UNITED STATES PATENT OFFICE 2,569,363

EMERGENCY SHUTOFF FOR FAUCETS

James P. Young, Paterson, N. J.

Application March 21, 1949, Serial No. 82,598

2 Claims. (Cl. 251—43)

This invention relates to new and useful improvements in faucets, and more particularly to means permitting a shut-off of the water supply at the faucet, while the faucet is being disassembled for the purpose of repacking or replacement of parts. The instant invention is an improvement on my previous Patent 2,267,007.

Other important objects of the invention will become more apparent as the following description proceeds.

In the drawings:

Figure 1 is a vertical sectional view through a conventional faucet with the emergency shut-off of the instant invention assembled therein;

Figure 2 is a vertical sectional view through the faucet with the bonnet, stem and handle removed and illustrating the position of the device in the shut-off position;

Figure 3 is a plan view of the seat member in the faucet;

Figure 4 is a sectional view taken substantially in the plane of section line 4—4 of Figure 3;

Figure 5 is a perspective view of the upper shaft member; and

Figure 6 is a perspective view of the lower shaft member bearing the auxiliary valve.

Specific reference will now be made to the drawings. In the several views, in the accompanying drawings and in the following specification, similar reference characters indicate corresponding elements throughout.

Indicated generally at 10 is a faucet in the form of a shell having a partition 12 dividing the faucet into an upper chamber 14 and a lower chamber 16. The chamber 16 is communicative by means of a threaded coupling 18 to a source of water supply (not shown). The partition 12 is provided with a threaded aperture for receiving a threaded bushing 20 containing an internally threaded bore 22, the elements 20 and 22 forming the seat structure.

The faucet is further provided with an externally threaded neck 24 for receiving the conventional bonnet 26, the neck 24 being internally threaded also to engage the threaded lower portion 28 of the rotatable stem 30 which carries a handle 32 at the top thereof and a valve 34 adapted to engage the seat members 20, 22.

The stem 30 is hollow and extending into the lower portion thereof is a lower shaft 34 having a groove 36 at the top end thereof. At the bottom of the shaft 34 is a threaded portion 38 which is received in the threaded bore 22 of the seat member and which carries at its free end a valve 40 in the form of a disk adapted to completely close the seat member 20, 22.

The handle 32 is provided with a central enlarged recess 42 into which extends the threaded end of the stem 30. Received in the upper end of the stem 30 is an upper shaft 44 which has a tongue 46 at its bottom end adapted to be received in the groove 36 of the lower shaft 34, and a screw driver receiving recess 48 at its top end. Normally, the upper shaft 44 is retained within the stem 30 disengaged from the lower shaft 34 so that the stem may be rotated by the handle 32 for opening and closing the faucet in normal operation. The means for slidably retaining the upper shaft 44 in this inoperative position comprises a resilient packing 46 about the upper shaft 44 and a bushing 48 on the top of the packing 46 to apply pressure thereto. The bushing is retained on the packing 46 by means of a threaded collar 50 which is retained on the threaded upper end of the stem 30. The handle 32 is further provided with a threaded aperture 52 for receiving a threaded cap 54 to allow access to the upper shaft 44 for operating the emergency shut-off of the instant invention.

In practical operation, after the cap 54 has been removed, a screwdriver is inserted in the recess 48 of the upper shaft 44 and the latter is pushed down so that the tongue 46 engages the groove 36 of the lower shaft 34. Thereafter, rotating the upper shaft 44 in a clockwise direction will urge the threaded portion 38 of the lower shaft 34 upwardly to the point where the valve 40 will completely close the seat member 20, 22, as shown clearly in Figure 2. This cuts off the water supply in the lower chamber 16 so that the bonnet, stem, and handle may be removed for repair without the necessity of cutting off the water supply somewhere else in the house.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a faucet having a shell and a seat structure in the shell having a threaded bore, an emergency valve structure comprising a lower shaft in said shell, a threaded portion at the bottom of said shaft received in said threaded bore, a valve carried at the free end of said threaded portion, means for raising and lowering said lower shaft whereby said valve selectively opens and closes said seat structure, said means including an upper shaft, means for yieldingly retaining said upper shaft in a preselected position whereby, when said upper shaft is depressed, it will engage said lower shaft to effect turning thereof, said upper shaft including a tongue at its bottom end, said lower shaft including a groove in its upper end adapted to receive said tongue, said retaining means including a faucet handle formed with a recess, a resilient packing in said recess about said upper shaft, and a bushing engaging said packing urging the latter against said upper shaft.

2. The combination of claim 1 and a removable cap mounted in said handle removably covering the recess whereby access to said upper shaft may be had.

JAMES P. YOUNG.

REFERENCES CITED

The following references are of record in the file of this patent:

UNITED STATES PATENTS

| Number | Name | Date |
|---|---|---|
| 575,545 | Dunn | Jan. 19, 1897 |
| 1,590,068 | Albrecht | June 22, 1926 |
| 1,621,165 | Hutchings | Mar. 15, 1927 |

FOREIGN PATENTS

| Number | Country | Date |
|---|---|---|
| 15,926 | Great Britain | of 1915 |
| 214,391 | Great Britain | of 1924 |
| 350,080 | Italy | of 1937 |